United States Patent
Wang et al.

(10) Patent No.: US 11,232,140 B2
(45) Date of Patent: Jan. 25, 2022

(54) METHOD AND APPARATUS FOR PROCESSING INFORMATION

(71) Applicant: BEIJING BAIDU NETCOM SCIENCE AND TECHNOLOGY CO., LTD., Beijing (CN)

(72) Inventors: Shuohuan Wang, Beijing (CN); Yu Sun, Beijing (CN); Dianhai Yu, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 777 days.

(21) Appl. No.: 16/054,920

(22) Filed: Aug. 3, 2018

(65) Prior Publication Data

US 2019/0065507 A1 Feb. 28, 2019

(30) Foreign Application Priority Data

Aug. 22, 2017 (CN) .......................... 201710722781.9

(51) Int. Cl.
*G06F 16/33* (2019.01)
*G10L 15/18* (2013.01)
(Continued)

(52) U.S. Cl.
CPC ........ *G06F 16/3347* (2019.01); *G06F 16/322* (2019.01); *G06F 16/951* (2019.01);
(Continued)

(58) Field of Classification Search
CPC .. G06F 16/3347; G06F 16/322; G06F 16/951; G06F 40/211; G06F 40/30;
(Continued)

(56) References Cited

U.S. PATENT DOCUMENTS

| | | | |
|---|---|---|---|
| 6,295,529 B1 * | 9/2001 | Corston-Oliver | G06F 40/194 707/715 |
| 2009/0070322 A1 * | 3/2009 | Salvetti | G06F 16/3334 |

(Continued)

FOREIGN PATENT DOCUMENTS

| | | |
|---|---|---|
| CN | 103646112 A | 3/2014 |
| CN | 106503265 A | 3/2017 |

*Primary Examiner* — Alicia M Willoughby
(74) *Attorney, Agent, or Firm* — Knobbe, Martens, Olson & Bear, LLP

(57) ABSTRACT

Embodiments of the present disclosure disclose a method and apparatus for processing information. A specific implementation of the method includes: acquiring a search result set related to a search statement inputted by a user; parsing the search statement to generate a first syntax tree, and parsing a search result in the search result set to generate a second syntax tree set; calculating a similarity between the search statement and the search result in the search result set using a pre-trained semantic matching model on the basis of the first syntax tree and the second syntax tree set, the semantic matching model being used to determine the similarity between the syntax trees; and sorting the search result in the search result set on the basis of the similarity between the search statement and the search result in the search result set, and pushing the sorted search result set to the user.

11 Claims, 4 Drawing Sheets

(51) Int. Cl.
*G06F 16/31* (2019.01)
*G06F 16/951* (2019.01)
*G06F 40/30* (2020.01)
*G06F 40/211* (2020.01)

(52) U.S. Cl.
CPC ............ *G06F 40/211* (2020.01); *G06F 40/30* (2020.01); *G10L 15/1815* (2013.01)

(58) Field of Classification Search
CPC .. G06F 16/953; G06F 16/338; G06F 16/3344; G10L 15/1815
See application file for complete search history.

(56) References Cited

U.S. PATENT DOCUMENTS

| | | | |
|---|---|---|---|
| 2012/0078889 A1* | 3/2012 | Chu-Carroll | G06F 16/248 707/723 |
| 2014/0114649 A1* | 4/2014 | Zuev | G06F 40/237 704/9 |
| 2015/0161134 A1* | 6/2015 | Balani | G06F 16/2425 707/731 |
| 2015/0278198 A1* | 10/2015 | Andreev | G06F 16/3344 704/9 |
| 2016/0147878 A1* | 5/2016 | Mana | G06F 16/3344 707/706 |
| 2016/0253333 A1* | 9/2016 | Galitsky | G06F 16/24578 707/706 |
| 2017/0140240 A1* | 5/2017 | Socher | G06N 3/0454 |
| 2017/0185673 A1 | 6/2017 | Liu et al. | |
| 2017/0193081 A1* | 7/2017 | Tang | G06F 16/3334 |

\* cited by examiner

METHOD AND APPARATUS FOR PROCESSING INFORMATION

CROSS-REFERENCE TO RELATED APPLICATIONS

This application claims priority to Chinese Patent Application no. 201710722781.9, filed with the State Intellectual Property Office of the People's Republic of China (SIPO) on Aug. 22, 2017, the content of which is incorporated herein by reference in its entirety.

TECHNICAL FIELD

The present disclosure relates to the technical field of computers, specifically to the technical field of Internet, and more particularly to a method and apparatus for processing information.

BACKGROUND

With the rapid development of the Internet, information resources on the network are continuously enriched, and the amount of information data is also increasing rapidly. Nowadays, searching for needed information through a search engine has become a main way for modern people to acquire information. Therefore, the main development direction of search engines today is to enhance the relevance of searches and provide users with more convenient effective query services.

SUMMARY

The object of embodiments of the present disclosure is providing an improved method and apparatus for processing information, to solve a part of the technical problems mentioned in the above Background.

In a first aspect, the embodiments of the present disclosure provides a method for generating and processing information, and the method includes: acquiring a search result set related to a search statement inputted by a user; parsing the search statement to generate a first syntax tree, and parsing a search result in the search result set to generate a second syntax tree set; calculating a similarity between the search statement and the search result in the search result set using a pre-trained semantic matching model on the basis of the first syntax tree and the second syntax tree set, the semantic matching model being used to determine the similarity between the syntax trees; and sorting the search result in the search result set on the basis of the similarity between the search statement and the search result in the search result set, and pushing the sorted search result set to the user.

In some embodiments, the calculating a similarity between the search statement and the search result in the search result set using a pre-trained semantic matching model on the basis of the first syntax tree and the second syntax tree set includes: generating a target word vector of a word located at a leaf node of the first syntax tree; generating a semantic characteristic of the search statement on the basis of the target word vector of the word in the first syntax tree and a target model function in the semantic matching model; generating, for a second syntax tree in the second syntax tree set, the target word vector of the word located at the leaf node of the second syntax tree, and generating the semantic characteristic of the search result corresponding to the second syntax tree on the basis of the target model function and the target word vector of the word in the second syntax tree; and calculating the similarity between the semantic characteristic of the search statement and the semantic characteristic of the search result in the search result set.

In some embodiments, the generating a semantic characteristic of the search statement on the basis of the target word vector of the word in the first syntax tree and a target model function in the semantic matching model includes: for the leaf node in the first syntax tree, using the target word vector of the word located at the leaf node as a parameter of the target model function in the semantic matching model to generate a node function of a child node corresponding to the leaf node in response to determining that the leaf node is not a root node; generating a node semantic vector on the basis of the node function of the child node; determining whether the child node is the root node, and executing the following steps in response to determining that the child node is not the root node: using the node semantic vector of the child node as the parameter of the target model function to generate the node function of a father node corresponding to the child node; generating the node semantic vector of the father node on the basis of the node function of the father node; determining whether the father node is the root node; and generating the semantic characteristic of the search statement on the basis of the node function and the node semantic vector of the father node in response to determining that the father node is the root node; and continuously executing the steps by taking the father node as the child node in response to determining that the father node is not the root node.

In some embodiments, each node in the first syntax tree includes a semantic tag, and the semantic tag is used to characterize a semantic relationship between a plurality of the words; and the determining whether the child node is the root node includes: determining whether the semantic tag of the child node matches a preset semantic tag; and determining that the child node is the root node in response to the semantic tag of the child node matching the preset semantic tag, or determining that the child node is not the root node in response to the semantic tag of the child node not matching the preset semantic tag.

In some embodiments, the method further includes generating the semantic matching model, and the generating the semantic matching model includes: establishing a training model on the basis of a recursive neural network; acquiring a sample search statement and a sample search result set related to the sample search statement, the sample search result set including a viewed sample search result and an unviewed sample search result; parsing the sample search statement and the sample search result set to generate a third syntax tree and a fourth syntax tree set respectively; and training the training model on the basis of the third syntax tree and the fourth syntax tree set to obtain the semantic matching model.

In some embodiments, the training the training model on the basis of the third syntax tree and the fourth syntax tree set includes: generating an initial word vector of the word located at the leaf node of the third syntax tree, and generating the initial word vector of the word located at the leaf node of a fourth syntax tree in the fourth syntax tree set; executing the following training steps: generating the semantic characteristic of the sample search statement, the viewed sample search result, and the unviewed sample search result on the basis of an initial model function in the training model, the initial word vector of the word in the third syntax tree, and the initial word vector of the word in the fourth syntax tree; calculating the similarity between the semantic characteristic of the sample search statement and the semantic characteristic of the viewed sample search result, and the similarity between the semantic characteristic of the sample search statement and the semantic characteristic of the unviewed sample search result as a first similarity and a second similarity respectively; determining whether a difference value between the first similarity and the second similarity meets a preset condition, and taking the initial model function and the initial word vector as the target model function and the target word vector respectively in response to determining that the difference value meets the preset condition; and updating the initial model function in the training model and the initial word vector of the word in response to determining that the difference value does not meet the preset condition, taking the updated initial model function and the updated initial word vector as the initial model function and the initial word vector of the word respectively, and continuously executing the training steps.

In some embodiments, the updating the initial model function in the training model and the initial word vector of the word includes: updating the initial model function in the training model and the initial word vector of the word using a back propagation through structure (BPTS) algorithm.

In some embodiments, before the acquiring a search result set related to a search statement inputted by a user, the method further includes: receiving a search voice inputted by the user; and recognizing the search voice to generate the search statement.

In a second aspect, the embodiments of the present disclosure provide an apparatus for processing information, and the apparatus includes: an acquisition unit configured for acquiring a search result set related to a search statement inputted by a user; an analysis unit configured for parsing the search statement to generate a first syntax tree, and parsing a search result in the search result set to generate a second syntax tree set; a calculation unit configured for calculating a similarity between the search statement and the search result in the search result set using a pre-trained semantic matching model on the basis of the first syntax tree and the second syntax tree set, the semantic matching model being used to determine the similarity between the syntax trees; and a push unit configured for sorting the search result in the search result set on the basis of the similarity between the search statement and the search result in the search result set, and pushing the sorted search result set to the user.

In some embodiments, the calculation unit includes: a first generation subunit configured for generating a target word vector of a word located at a leaf node of the first syntax tree; a second generation subunit configured for generating a semantic characteristic of the search statement on the basis of the target word vector of the word in the first syntax tree and a target model function in the semantic matching model; a third generation subunit configured for generating, for a second syntax tree in the second syntax tree set, the target word vector of the word located at the leaf node of the second syntax tree, and generating the semantic characteristic of the search result corresponding to the second syntax tree on the basis of the target model function and the target word vector of the word in the second syntax tree; and a calculation subunit configured for calculating similarity between the semantic characteristic of the search statement and the semantic characteristic of the search result in the search result set.

In some embodiments, the second generation subunit is further configured for: for the leaf node in the first syntax tree, using the target word vector of the word located at the leaf node as a parameter of the target model function in the semantic matching model to generate a node function of a child node corresponding to the leaf node in response to determining that the leaf node is not a root node; generating a node semantic vector on the basis of the node function of the child node; determining whether the child node is the root node, and executing the following steps in response to determining that the child node is not the root node: using the node semantic vector of the child node as the parameter of the target model function to generate the node function of a father node corresponding to the child node; generating the node semantic vector of the father node on the basis of the node function of the father node; determining whether the father node is the root node; and generating the semantic characteristic of the search statement on the basis of the node function and the node semantic vector of the father node in response to determining that the father node is the root node; and continuously executing the steps by taking the father node as the child node in response to determining that the father node is not the root node.

In some embodiments, each node in the first syntax tree includes a semantic tag, and the semantic tag is used to characterize a semantic relationship between a plurality of the words; and the second generation subunit is further configured for: determining whether the semantic tag of the child node matches a preset semantic tag; determining that the child node is the root node in response to the semantic tag of the child node matching the preset semantic tag, or determining that the child node is not the root node in response to the semantic tag of the child node not matching the preset semantic tag.

In some embodiments, the apparatus further includes a generation unit for generating the semantic matching model, and the generation unit includes: an establishment subunit configured for establishing a training model on the basis of a recursive neural network; an acquisition subunit configured for acquiring a sample search statement and a sample search result set related to the sample search statement, the sample search result set including a viewed sample search result and an unviewed sample search result; an analysis subunit configured for parsing the sample search statement and the sample search result set to generate a third syntax tree and a fourth syntax tree set respectively; and a training subunit configured for training the training model on the basis of the third syntax tree and the fourth syntax tree set to obtain the semantic matching model.

In some embodiments, the training subunit is further configured for: generating an initial word vector of the word located at the leaf node of the third syntax tree, and generating the initial word vector of the word located at the leaf node of a fourth syntax tree in the fourth syntax tree set; executing the following training steps: generating the semantic characteristic of the sample search statement, the viewed sample search result, and the unviewed sample search result on the basis of an initial model function in the training model, the initial word vector of the word in the third syntax tree, and the initial word vector of the word in each fourth syntax tree, calculating the similarity between the semantic characteristic of the sample search statement and the semantic characteristic of the viewed sample search result, and the similarity between the semantic characteristic of the sample search statement and the semantic characteristic of the unviewed sample search result as a first similarity and a second similarity respectively, determining whether a difference value between the first similarity and the second similarity meets a preset condition, and taking the initial model function and the initial word vector as the target model function and the target word vector respectively in response to determining that the difference value meets the preset condition; and updating the initial model function in the training model and the initial word vector of the word in response to determining that the difference value does not meet the preset condition, taking the updated initial model function and the updated initial word vector as the initial model function and the initial word vector of the word respectively, and continuously executing the training steps.

In some embodiments, the training subunit is further configured for: updating the initial model function in the training model and the initial word vector of the word using a back propagation through structure (BPTS) algorithm.

In some embodiments, the apparatus further includes: a receiving unit configured for receiving a search voice inputted by the user; and an recognition unit configured for recognizing a search voice to generate the search statement.

In a third aspect, the embodiments of the present disclosure provide a server including: one or more processors, and a storage device for storing one or more programs, wherein when the one or more programs are executed by the one or more processors, the one or more processors implement the method described in any embodiment in the above-mentioned method for generating information.

In a fourth aspect, the embodiments of the present disclosure provide a computer readable storage medium on which computer programs are stored. When the computer programs are executed by the processors, the method described in any embodiment in the above-mentioned method for generating information is implemented.

According to the method and apparatus for processing information, provided by the embodiments of the present disclosure, by acquiring a search result set related to a search statement inputted by a user, and parsing the search statement and each search result in the search result set, a first syntax tree and a second syntax tree set can be obtained respectively; then, by calculating a similarity between the search statement and each search result using a pre-trained semantic matching model on the basis of the first syntax tree and the second syntax tree set, the matching degree between each search result and the search statement can be determined; then, the search results in the search result set are sorted on the basis of the similarity between the search statement and each search result; and finally, and the sorted search result set is pushed to the user, thereby improving the matching degree between a search result and a user requirement, and then improving the searching experience of the user.

BRIEF DESCRIPTION OF THE DRAWINGS

Other features, objects and advantages of the present application will become more apparent by reading a detailed description of the nonrestrictive embodiments made with reference to the following drawings.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
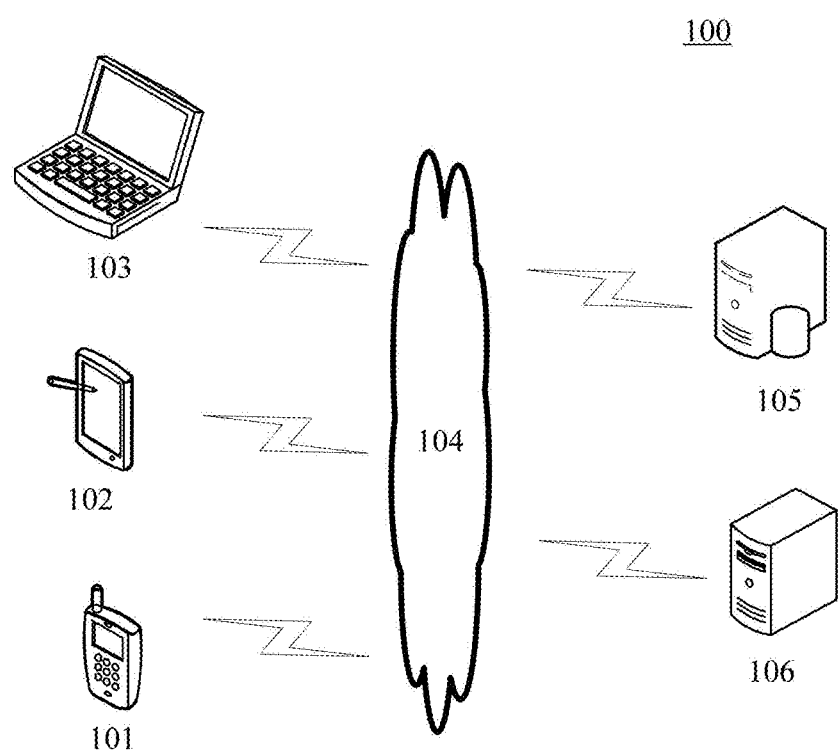
FIG. 1 is an illustrative system architecture diagram to which the present disclosure can be applied.

FIG. 1 shows an illustrative architecture of a system 100 in which a method for processing information or an apparatus for processing information according to the present disclosure may be applied.

As shown in FIG. 1, the system architecture 100 may include terminal devices 101, 102 and 103, a network 104, a database server 105, and a server 106. The network 104 serves as a medium providing a communication link between the terminal devices 101, 102 and 103, the database server 105, and the server 106. The network 104 may include various types of connections, such as wired or wireless transmission links, or optical fibers.

The user may use the terminal devices 101, 102 and 103 to interact with the database server 105, or the server 106 through the network 104, in order to transmit or receive messages, etc. Various communication client applications, such as web browser applications, and search applications may be installed on the terminal devices 101, 102 and 103.

The terminal devices 101, 102 and 103 may be various electronic devices having a display and capable of searching for and browsering a webpage, including but not limited to, smart phones, tablet computers, e-book readers, laptop computers, and desktop computers.

The database server 105 may be a server providing various services, for example, a database server providing support to the search webpage displayed on the terminal devices 101, 102 or 103.

The server 106 may be a server providing various services, for example, a data analysis server for analyzing the search statement inputted by the terminal devices 101, 102 or 103. The data analysis server may acquire a search result set related to the search statement from the database server 105, conduct processing such as analysis on the search statement and the search result set, and return a processing result (for example, a sorted search result set) to the terminal devices.

It should be noted that the method for processing information according to the embodiments of the present application is generally executed by the server 106. Accordingly, an apparatus for processing information is generally installed on the server 106.

It should be noted that when the server 106 has the function of the database server 105, the architecture of a system 100 may not have the database server 105.

It should be appreciated that the numbers of the terminal devices, the networks, the database servers, and the servers in FIG. 1 are merely illustrative. Any number of terminal devices, networks, database servers, and servers may be provided based on the actual requirements.

Figure 2:
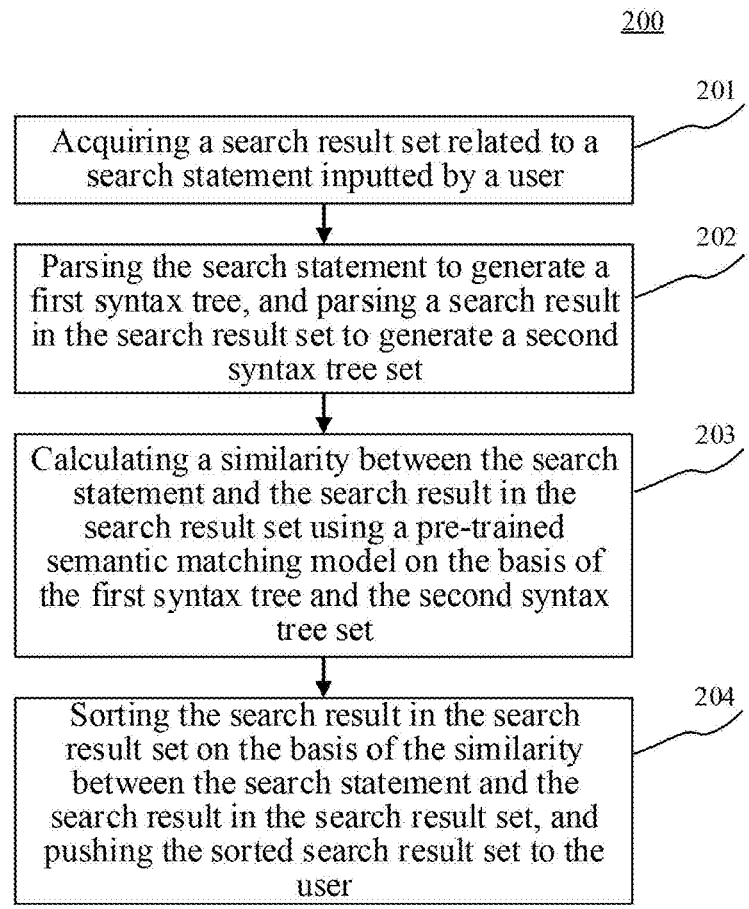
FIG. 2 is a flow diagram of an embodiment of the method for processing information according to the present disclosure.

Further referring to FIG. 2, a flow 200 of an embodiment of the method for processing information according to the present disclosure is shown. The method for processing information may include:

Step 201, acquiring a search result set related to a search statement inputted by a user.

In the present embodiment, an electronic device (e.g., a server 106 shown in FIG. 1) on which the method for processing information runs can acquire the search result set related to the search statement from a database server (e.g., a database server 105 shown in FIG. 1) that processes the search statement inputted by the user through a wired connection mode or a wireless connection mode. Here, the database server can first receive the search statement inputted by the user using a terminal (e.g., terminal devices 101, 102 and 103 shown in FIG. 1); then the database server searches for the search result set related to the search statement and sends the search result set to the terminal used by the user; and then the electronic device can intercept the search result set sent by the database server, thereby acquiring the search result set. As an example, the electronic device can receive the search statement sent by the user using the terminal; and the search statement is then sent to the database server to acquire the search result set related to the search statement.

In the present embodiment, the electronic device can also find out whether there is a search result set related to the search statement locally after receiving the search statement. When the search result set related to the search statement does not exist locally, the electronic device can continue to acquire the search result set related to the search statement from the database server in communication connection with the electronic device.

It can be understood that the user can input the search statement in an input box of a browser web page displayed on the terminal. The search statement here can be either a word or a syntactically related group of word sequence. Moreover, the search statement may contain various characters, such as words, numbers, symbols, letters, or foreign words. The search result here can be various search results related to the search statement, such as web pages, pictures, videos, and news. The search result can generally include a URL (Uniform Resource Locator) and text information describing the contents of the search results. The text information here may include at least one of titles or abstracts.

It should be pointed out that the user can input the search statement in various ways on the terminal, for example, through an input method provided by the terminal, or through copying and pasting. In some optional implementations of the present embodiment, the user can also use voice input. At the moment, the electronic device can receive a search voice inputted by the user. Then, the electronic device uses an existing voice recognition technology to recognize the search voice, and then generates a search statement in text corresponding to the search voice.

Step 202, parsing the search statement to generate a first syntax tree, and parsing a search result in the search result set to generate a second syntax tree set.

In the present embodiment, the electronic device can parse the acquired search statement and each search result in the search result set related to the search statement, thereby generating a first syntax tree of the search statement and a second syntax tree set of the search result set respectively. Each second syntax tree in the second syntax tree set corresponds to each search result.

In the present embodiment, parsing usually refers to analyzing grammatical functions of the words in the sentence. Here, the function of parsing is to analyze the structural relationship of text information in a search statement and a search result. For example, the structural relationship between words can be obtained by performing tokenization and analysis on an inputted search statement. According to the structural relationship, the electronic device can sequentially store each word in a word sequence obtained by tokenization in a leaf node of a tree structure. Then, nodes in each layer of the tree structure are generated until the root node on the basis of the structural relationship between the words. The tree structure at this time is a syntax tree corresponding to the word sequence. In other words, the syntax tree is a tree structure that characterizes the structural relationship between the words in a group of word sequence.

Figure 3:
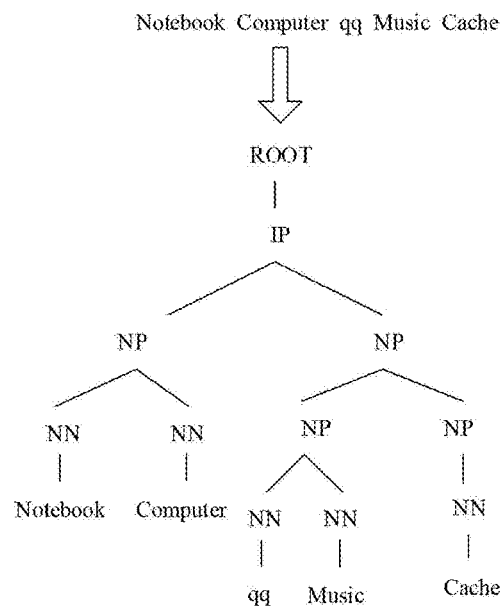
FIG. 3 is a structure diagram of an embodiment of a syntax tree obtained by the method for processing information according to the present disclosure.

As an example, the electronic device can parse a search statement "notebook computer qq music cache" and generate a syntax tree corresponding to the search statement. As shown in FIG. 3, the word sequence obtained by the tokenization of the search statement is "notebook|computer|qq-|music|cache." In the syntax tree corresponding to the search statement, each word in the word sequence is located at a leaf node of the syntax tree. Moreover, according to the structural relationship obtained by parsing, the leaf node of the syntax tree may also contain a part-of-speech tag for describing the part-of-speech of a word. As shown in FIG. 3, "NN" represents a noun. Each child node may also contain a semantic tag for describing a semantic relationship between the words. As shown in FIG. 3, "NP" represents a noun phrase. A semantic tag "IP" for the root node "ROOT" represents a complete statement. It can be understood that parsing is a commonly used analytical method, and a parsing technology in the prior art is relatively mature, and will not be repeated here.

Step 203, calculating a similarity between the search statement and the search result in the search result set using a pre-trained semantic matching model on the basis of the first syntax tree and the second syntax tree set.

In the present embodiment, the electronic device can calculate the similarity between the search statement and the search result in the search result set using the pre-trained semantic matching model on the basis of the first syntax tree and the second syntax tree set obtained in step 202. The semantic matching model can be used to determine the similarity between the syntax trees.

In the present embodiment, a plurality of pre-trained semantic matching models may be stored in the electronic device. Each semantic matching model stored in the electronic device corresponds to a given search type. The search type here may include a web page type, a video type, or a picture type. The electronic device can first divide the search results in the search result set into different search types based on the contents of the search results; and then, the first syntax tree and each second syntax tree are inputted into a pre-trained semantic matching model corresponding to the search type of the search results, and the similarity between the search statement and each search result is obtained. As an example, the semantic matching model may be a calculation formula used to characterize the similarity between the syntax trees. This calculation formula can be obtained by technicians through a similarity calculation of nodes in a large number of syntax trees. The large number of syntax trees can be the syntax trees of the search statements in the search engines and the syntax trees of the viewed search results related to the search statements. For example, the calculation formula can represent weighted summation of the similarities of nodes with the identical semantic tags to obtain the syntactic tree similarity and normalization of the syntactic tree similarity, and the normalized syntactic tree similarity is used as a calculation result of the semantic matching model. In the process of semantic matching, not only words themselves are used, but also semantic tags and other information in the parsing are used, so that hierarchical information and closeness between the words can be considered, which is helpful to improve the accuracy of the semantic matching.

In some optional implementations of the present embodiment, the electronic device can calculate the similarity between the search statement and each search result by the following steps:

First, the electronic device can generate a target word vector of a word located at a leaf node of the first syntax tree. It should be pointed out that in a neural network language model, a word vector (word embedding) is usually used to represent a word. That is to say, a vector is used to describe a word, so that, to a certain extent, a semantic distance between words can be described. At the moment, since the electronic device has generated the first syntax tree, the word located at each leaf node of the first syntax tree can be determined, and then a word vector of each word can be generated. It should be noted that the word vector is a class of parameter of the neural network language model, and with the continuous training and optimization of the model, the word vector therein is also continuously optimized. The target word vector here refers to the word vector that is finally optimized.

Then, the electronic device generates the semantic characteristic of the search statement on the basis of the target word vector of each word in the first syntax tree and the target model function in the semantic matching model. It should be pointed out that in the neural network language model, a bottom-up (from a leaf node to the root node) mode is usually used to obtain the semantic vector of the whole sentence according to the word vector and model function. The model function here can be used to characterize the structural relationship between a child node and a father node. As an example, if the model function is W, and word vectors of notebook and computer located at the leaf nodes in FIG. 3 are S1 and S2 respectively, the semantic vectors $S_{1,2}$ of the child nodes corresponding to the two leaf nodes are: $S_{1,2}$=tan h(W[S1; S2]). S1 and S2 are a n-dimensional vector respectively, n is a positive integer, and tan h here is only one of nonlinear transformation forms, and can also be replaced by other nonlinear transformation forms. It should be noted that with the continuous training and optimization of the model, the model function therein is also continuously optimized. Moreover, the model can learn different model functions for different semantic tags of the nodes. The target model function here refers to a model function that is finally optimized. According to the above calculation process, the electronic device can perform layer-by-layer calculation on the basis of the target word vector of each word in the first syntax tree and the target model function in the semantic matching model, so that the semantic vector of the root node $S_{root}$ is obtained, and the $S_{root}$ can be used as the semantic characteristic of the search statement.

Optionally, the electronic device can also adopt the following steps to generate the semantic characteristic of the search statement:

1) For the leaf node in the first syntax tree, the electronic device can use the target word vector of the word located at the leaf node as a parameter of the target model function in the semantic matching model to generate a node function of a child node corresponding to the leaf node in response to determining that the leaf node is not the root node. As an example, if the target model function is W and the target word vectors of the words of the leaf nodes are S1 and S2 respectively, the node function $W_{1,2}$ of the corresponding child nodes is: $W_{1,2}$=W[S1; S2].

It can be understood that the electronic device can determine whether each node in the first syntax tree is the root node through various methods. For example, the electronic device can determine whether a father node exists at the upper layer of the node; if the father node exists, the node is not the root node; and if the father node does not exist, the node is the root node. As an example, each node in the first syntax tree may contain a semantic tag. The semantic tag is used to characterize a semantic relationship between the words. At the moment, the electronic device can also determine whether the semantic tag of the node matches a preset semantic tag. The preset semantic tag here may be the semantic tag of the root node (e.g., "IP" shown in FIG. 3). If the semantic tag of the node matches the preset semantic tag, the node is determined as the root node, or otherwise, the child node is not determined as the root node. It should be noted that if the leaf node is the root node, the target word vector of the word of the leaf node is the semantic characteristic of the search statement. That is to say, the search statement is a word.

2) The electronic device can generate a node semantic vector on the basis of the node function of the child node. Here, the electronic device can use the above method to generate the node semantic vector, i.e. $S_{1,2}$=tan h($W_{1,2}$). tan h here is also only one of nonlinear transformation forms, and can be replaced by other nonlinear transformation forms.

3) The electronic device can determine whether the child node is the root node, and execute the following steps in response to determining that the child node is not the root node:

Taking the node semantic vector of the child node as a parameter of the target model function to generate the node function of the father node corresponding to the child node, and generating the node semantic vector of the father node on the basis of the node function of the father node. The specific process can refer to the descriptions in 1) and 2) above, and will not be repeated here. Then, whether the father node is the root node is determined. In response to determining that the father node is the root node, a semantic characteristic of the search statement is generated on the basis of the node function and the node semantic vector of the father node. The semantic characteristic here equals the node function of the root node multiplied by the node semantic vector of the root node.

4) The electronic device can take the father node as the child node to continuously execute the cycle steps in 3) in response to determining that the father node is not the root node.

Then, the electronic device also can generate the target word vector of the word located at the leaf node of the second syntax tree for each second syntax tree in the second syntax tree set, and generate the semantic characteristic of the search result corresponding to the second syntax tree on the basis of the target model function and the target word vector of the word in the second syntax tree. The process of generating the semantic characteristic of the search result can refer to related description of the process of generating the semantic characteristic of the search statement and will not be described in detail here.

Finally, the electronic device can calculate the similarity between the semantic characteristic of the search statement and the semantic characteristic of the search result in the search result set. The similarity can be calculated using a cosine function.

In some optional implementations of the present embodiment, the electronic device can also carry out the steps of generating and training the semantic matching model, and the details can refer to the embodiment shown in FIG. 3 and will not be repeated here.

Step 204, sorting the search result in the search result set on the basis of the similarity between the search statement and the search result in the search result set, and pushing the sorted search result set to the user.

In the present embodiment, the electronic device can sort the search result in the search result set according to the similarity between the search statement and each search result, for example, according to the value of the similarity in descending order. Moreover, the electronic device can push the sorted search result set to the terminal used by the user so as to display the search result in the sorted order on the terminal. In this way, the search result with a high correlation degree to the search statement can be preferentially displayed to the user, thus reducing the time for the user to search for required contents.

According to the method for processing information, provided by the embodiments of the present disclosure, by acquiring a search result set related to a search statement inputted by a user, and parsing the search statement and each search result in the search result set, a first syntax tree and a second syntax tree set can be obtained respectively; then, by calculating the similarity between the search statement and each search result using a pre-trained semantic matching model on the basis of the first syntax tree and the second syntax tree set, the matching degree between each search result and the search statement can be determined; then, the search result in the search result set are sorted on the basis of the similarity between the search statement and each search result; and finally, and the sorted search result set is pushed to the user, thereby improving the matching degree between the search result and the user requirement, and then improving the searching experience of the user.

Figure 4:
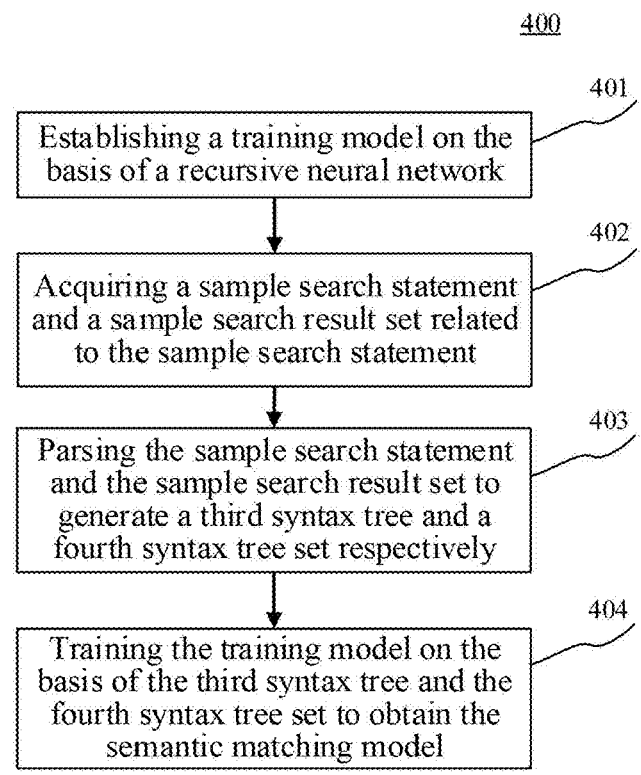
FIG. 4 is a flow diagram of an embodiment of generating the semantic matching model in the present disclosure.

Further refer to FIG. 4, it shows a flow 400 of an embodiment of generating the semantic matching model in the present disclosure. The generating process may include:

Step 401, establishing a training model on the basis of a recursive neural network.

In the present embodiment, the electronic device (e.g., the server 106 shown in FIG. 1) may establish a training model on the basis of a recursive neural network (RNN). The training model here is a deep neural network model based on a tree structure.

Step 402, acquiring a sample search statement and a sample search result set related to the sample search statement.

In the present embodiment, the electronic device can acquire the sample search statement and the sample search result set related to the sample search statement through various ways. For example, the electronic device can acquire the sample search statement and the sample search result set from a database server (e.g., the database server 105 shown in FIG. 1) that is in communication connection with the electronic device, or acquire them locally. At the moment, the sample search statement and the sample search result set in the local can be extracted by a technician from search logs of search engines of other servers and stored locally in the electronic device in advance. The sample search result set includes a viewed sample search result and an unviewed sample search result. It should be pointed out that a search statement may be searched by a plurality of users or by one user for several times. Here, once the user clicks on a corresponding search result, the search result can be determined to be the viewed search result. Thus, sample data can be enriched to facilitate the improvement of the accuracy of the semantic matching model obtained by training.

Step 403, parsing the sample search statement and the sample search result set to generate a third syntax tree and a fourth syntax tree set respectively.

In the present embodiment, the electronic device can parse the sample search statement and each sample search result to generate a third syntax tree and a fourth syntax tree set respectively. Each fourth syntax tree in the fourth syntax tree set corresponds to each sample search result in the sample search result set. The specific generating process can refer to step 202 in the embodiment of FIG. 2 and will not be described in detail here.

Step 404, training the training model on the basis of the third syntax tree and the fourth syntax tree set to obtain the semantic matching model.

In the present embodiment, the electronic device can train the training model established in step 401 on the basis of the third syntax tree and the fourth syntax tree set to obtain the semantic matching model. The specific training process can refer to the following steps:

First, the electronic device can generate an initial word vector of the word located at the leaf node of the third syntax tree, and generate the initial word vector of the word located at the leaf node of each fourth syntax tree in the fourth syntax tree set. The initial word vector here may be any word vector generated by the electronic device, or the word vector generated by the electronic device according to the presetting of a technician.

Secondly, the electronic device can execute the following training steps:

1) generating the semantic characteristic of the sample search statement, the viewed sample search result, and the unviewed sample search result on the basis of the initial model function in the training model, the initial word vector of each word in the third syntax tree, and the initial word vector of each word in each fourth syntax tree. The specific process can refer to related descriptions of step 203 in the embodiment of FIG. 2 and will not be described in detail here.

2) calculating the similarity between the semantic characteristic of the sample search statement and the semantic characteristic of the viewed sample search result, and the similarity between the semantic characteristic of the sample search statement and the semantic characteristic of the unviewed sample search result respectively, and taking the similarities as a first similarity and a second similarity respectively. The specific process can also refer to related descriptions of step 203 in the embodiment of FIG. 2 and will not be described in detail here.

3) determining whether a difference value between the first similarity and the second similarity meets a preset condition, and taking the initial model function and the initial word vector as the target model function and the target word vector respectively in response to determining that the difference value meets the preset condition. The preset condition here means that the value of subtracting the second similarity from the first similarity is not less than a preset value (for example, 0.1). If the difference value is not less than the preset value, the preset condition is met; and if the difference is less than the preset value, the preset condition is not met.

It can be understood that a search statement often corresponds to at least one viewed sample search result and a plurality of unviewed sample search results. At the moment, as an example, the preset condition may also be an optimization function L:

$$L = \sum_{q \in D} \sum_{T \in q} \sum_{T' \in q} (\max(0.1 - (S(V_T, V_q) - S(V_{T'}, V_q)), 0)) = 0;$$

wherein, D represents a sample data set, q represents a sample search statement in D and a sample search result set related to the sample search statement, T represents a viewed sample search result in q, T' represents an unviewed sample search result in q, $V_q$ represents a semantic characteristic of the sample search statement, $V_T$ represents the semantic characteristic of the viewed sample search result, $V_{T'}$ represents the semantic characteristic of the unviewed sample search result, $S(V_T, V_q)$ represents the first similarity, and $S(V_{T'}, V_q)$ represents the second similarity. It can be understood that when L=0, the difference value between any first similarity and any second similarity is not less than 0.1.

Finally, the electronic device updates the initial model function in the training model and the initial word vector of the word in response to determining that the difference value does not meet the preset condition, takes the updated initial model function and the updated initial word vector as the initial model function and the initial word vector of the word respectively, and continuously executes the above training steps.

Optionally, the electronic device can update the initial model function in the training model and the initial word vector of the word using a BPTS (Back Propagation Through Structure) technology. In this way, the electronic device can acquire gradient changes between nodes from top to bottom (from the root node to a leaf node), thus adjusting the initial word vector and the initial model function.

The generating the semantic matching model in the present embodiment includes training the training model established by RNN by acquiring the sample search statement, the viewed sample search result, and the unviewed sample search result. The training model is optimized by using an optimization function and a BPTS algorithm. In the process of generation, not only the information of words but also higher level of the semantic characteristic such as syntax and semantic relationships are considered, and these information can enable the trained semantic matching model to better understand main components of an analyzed statement, thus obtaining a more accurate semantic matching result. At the same time, using rich sample data for model training is also helpful to improve the accuracy of the semantic matching result of the semantic matching model.

Figure 5:
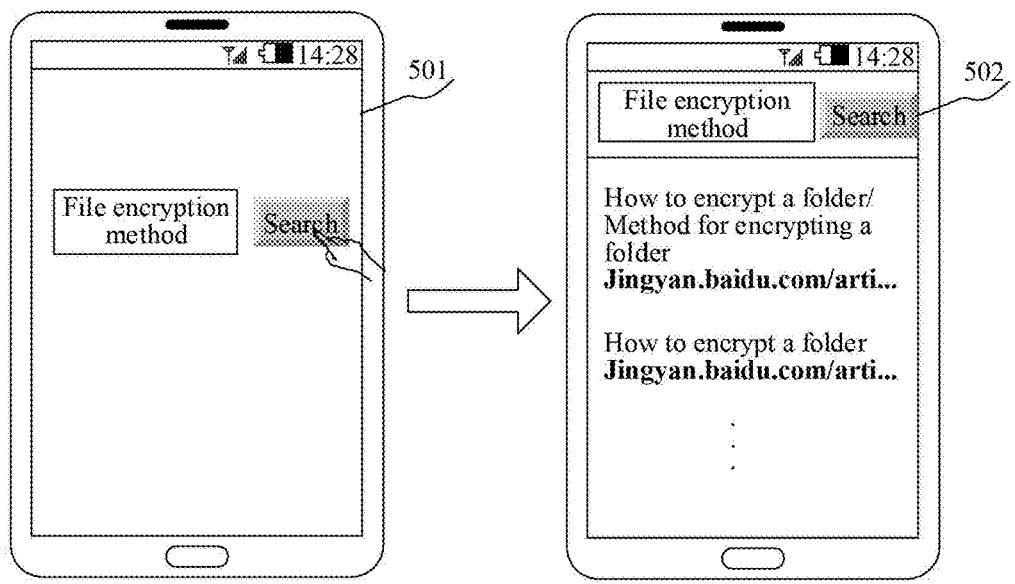
FIG. 5 is a schematic diagram of an application scenario of the method for processing information according to the present disclosure.

Continue to refer FIG. 5, FIG. 5 is a schematic diagram of an application scenario of the method for processing information according to the present embodiment. In the application scenario of FIG. 5, as shown in FIG. 501, a user can enter a search statement "file encryption method" in an input box provided by a browser web page displayed on a terminal. After receiving the search statement, the server can first acquire a search result set related to the "file encryption method," then parses the search statement and the acquired search result set, calculates the similarity between the search statement and each search result respectively in a semantic matching model trained and stored in advance, and finally, sorts the search results according to the value of each calculated similarity, and sends the sorted search result set to the terminal used by the user. At the moment, as shown in FIG. 502, the sorted search results related to the "file encryption method" can be displayed on the terminal for the user to click and view. The search results can include contents such as a title "how to encrypt a folder/method for encrypting a folder" with a corresponding URL of "jing-yan.baidu.com/arti . . . ," and a title "how to encrypt a folder" with a corresponding URL of "Jing yan.baidu.com/arti . . . ."

Figure 6:
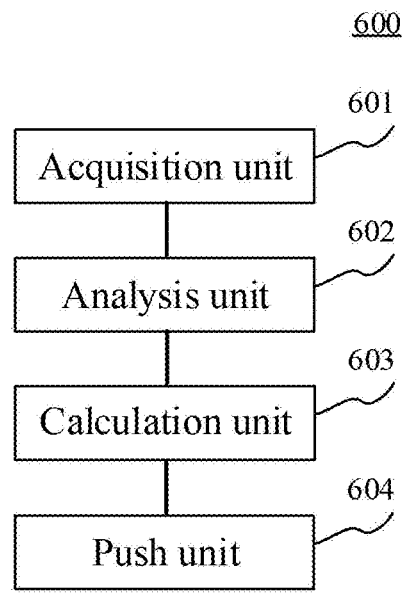
FIG. 6 is a structure diagram of an embodiment of the apparatus for processing information according to the present disclosure.

Further referring to FIG. 6, as an implementation of the method shown in the above figures, the present disclosure provides an embodiment of an apparatus for processing information. The embodiment of the apparatus corresponds to the embodiment of the method shown in FIG. 2, and the device can be specifically applied to various electronic devices.

As shown in FIG. 6, the apparatus 600 for processing information includes: an acquisition unit 601, configured for acquiring a search result set related to a search statement inputted by a user; an analysis unit 602, configured for parsing the search statement to generate a first syntax tree, and parsing a search result in the search result set to generate a second syntax tree set; a calculation unit 603, configured for calculating a similarity between the search statement and the search result in the search result set using a pre-trained semantic matching model on the basis of the first syntax tree and the second syntax tree set; and a push unit 604, configured for sorting the search result in the search result set on the basis of the similarity between the search statement and the search result in the search result set, and pushing the sorted search result set to the user.

In the present embodiment, specific implementations of and beneficial effects generated by the acquisition unit 601, the analysis unit 602, the calculation unit 603, and the push unit 604 can refer to related descriptions of step 201, step 202, step 203 and step 204 in the embodiment shown in FIG. 2 respectively, and will not be repeated here.

In some optional implementations of the present embodiment, the calculation unit 603 may include: a first generation subunit (not shown), configured for generating a target word vector of a word located at a leaf node of the first syntax tree; a second generation subunit (not shown), configured for generating a semantic characteristic of the search statement on the basis of the target word vector of the word in the first syntax tree and a target model function in the semantic matching model; a third generation subunit (not shown), configured for generating, for a second syntax tree in the second syntax tree set, the target word vector of the word located at the leaf node of the second syntax tree, and generating the semantic characteristic of the search result corresponding to the second syntax tree on the basis of the target model function and the target word vector of the word in the second syntax tree; and a calculation subunit (not shown), configured for calculating the similarity between the semantic characteristic of the search statement and the semantic characteristic of the search result in the search result set.

In some optional implementations of the present embodiment, the second generation subunit can be further configured for: for the leaf node in the first syntax tree, using the target word vector of the word located at the leaf node as a parameter of the target model function in the semantic matching model to generate a node function of a child node corresponding to the leaf node in response to determining that the leaf node is not a root node; generating a node semantic vector on the basis of the node function of the child node; determining whether the child node is the root node, and executing the following steps in response to determining that the child node is not the root node: using the node semantic vector of the child node as the parameter of the target model function to generate the node function of a father node corresponding to the child node; generating the node semantic vector of the father node on the basis of the node function of the father node; determining whether the father node is the root node; and generating the semantic characteristic of the search statement on the basis of the node function and the node semantic vector of the father node in response to determining that the father node is the root node; and continuously executing the steps by taking the father node as the child node in response to determining that the father node is not the root node.

As an example, each node in the first syntax tree may include a semantic tag, and the semantic tag is used to characterize a semantic relationship between the words; and the second generation subunit can be further configured for: determining whether the semantic tag of the child node matches a preset semantic tag; and determining that the child node is the root node in response to the semantic tag of the child node matching the preset semantic tag, or determining that the child node is not the root node in response to the semantic tag of the child node not matching the preset semantic tag.

In some optional implementations of the present embodiment, the apparatus 600 may further include a generation unit (not shown) for generating the semantic matching model, and the generation unit may include: an establishment subunit configured for establishing a training model on the basis of a recursive neural network; an acquisition subunit configured for acquiring a sample search statement and a sample search result set related to the sample search statement, the sample search result set including a viewed sample search result and an unviewed sample search result; an analysis subunit configured for parsing the sample search statement and the sample search result set to generate a third syntax tree and a fourth syntax tree set respectively; and a training subunit configured for training the training model on the basis of the third syntax tree and the fourth syntax tree set to obtain the semantic matching model.

Optionally, the training subunit can be further configured for: generating an initial word vector of the word located at the leaf node of the third syntax tree, and generating the initial word vector of the word located at the leaf node of a fourth syntax tree in the fourth syntax tree set; executing the following training steps: generating the semantic characteristic of the sample search statement, the viewed sample search result, and the unviewed sample search result on the basis of an initial model function in the training model, the initial word vector of the word in the third syntax tree, and the initial word vector of the word in the fourth syntax tree; calculating the similarity between the semantic characteristic of the sample search statement and the semantic characteristic of the viewed sample search result, and the similarity between the semantic characteristic of the sample search statement and the semantic characteristic of the unviewed sample search result as a first similarity and a second similarity respectively; determining whether a difference value between the first similarity and the second similarity meets a preset condition, and taking the initial model function and the initial word vector as the target model function and the target word vector respectively in response to determining that the difference value meets the preset condition; and updating the initial model function in the training model and the initial word vector of the word in response to determining that the difference value does not meet the preset condition, taking the updated initial model function and the updated initial word vector as the initial model function and the initial word vector of the word respectively, and continuously executing the training steps.

Further, the training subunit can be further configured for: updating the initial model function in the training model and the initial word vector of the word using a back propagation through structure (BPTS) algorithm.

In some optional implementations of the present embodiment, the apparatus 600 may further include: a receiving unit (not shown), configured for receiving a search voice inputted by the user; and an recognition unit (not shown), configured for recognizing the search voice to generate the search statement.

Figure 7:
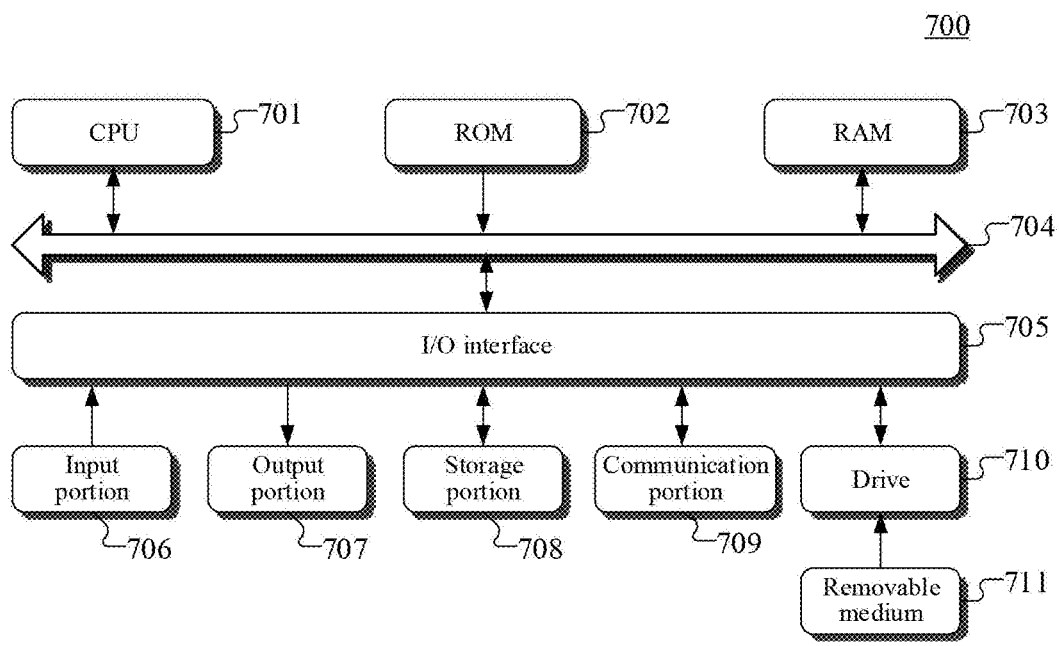
FIG. 7 is a structure diagram of a computer system of a server suitable for implementing the embodiments of the present disclosure.

Referring to FIG. 7, a schematic structural diagram of a computer system 700 adapted to implement a server of the embodiments of the present application is shown. The server shown in FIG. 7 is merely an example and should not impose any restriction on the function and scope of use of the embodiments of the present application.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 comprising a cathode ray tube (CRT), a liquid crystal display device (LCD), a speaker etc.; a storage portion 708 including a hard disk and the like; and a communication portion 709 comprising a network interface card, such as a LAN card and a modem. The communication portion 709 performs communication processes via a network, such as the Internet. A drive 710 is also connected to the I/O interface 705 as required. A removable medium 711, such as a magnetic disk, an optical disk, a magneto-optical disk, and a semiconductor memory, may be installed on the drive 710, to facilitate the retrieval of a computer program from the removable medium 711, and the installation thereof on the storage portion 708 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 709, and/or may be installed from the removable media 711. The computer program, when executed by the central processing unit (CPU) 701, implements the above mentioned functionalities as defined by the methods of the present disclosure. It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising an acquisition unit, an analysis unit, a calculation unit, and a push unit, where the names of these units or modules do not in some cases constitute a limitation to such units or modules themselves. For example, the acquisition unit may also be described as "a unit for acquiring a search result set related to a search statement inputted by a user."

In another aspect, the present application further provides a non-transitory computer-readable storage medium. The non-transitory computer-readable storage medium may be the non-transitory computer-readable storage medium included in the apparatus in the above described embodiments, or a stand-alone non-transitory computer-readable storage medium not assembled into the apparatus. The non-transitory computer-readable storage medium stores one or more programs. The one or more programs, when executed by a device, cause the device to: acquire a search result set related to a search statement inputted by a user; parse the search statement to generate a first syntax tree, and parse a search result in the search result set to generate a second syntax tree set; calculate a similarity between the search statement and the search result in the search result set using a pre-trained semantic matching model on the basis of the first syntax tree and the second syntax tree set, the semantic matching model being used to determine the similarity between the syntax trees; and sort the search result in the search result set on the basis of the similarity between the search statement and the search result in the search result set, and push the sorted search result set to the user.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for processing information, the method comprising:
    acquiring, by a processor of a server, a search result set from a database server via a wired or a wireless connection, the acquired search result set being related to a search statement inputted by a user;
    parsing, by the processor, the search statement to generate a first syntax tree, and parsing a search result in the search result set to generate a second syntax tree set;
    generating, by the processor, a target word vector of a word located at a leaf node of the first syntax tree;
    generating, by the processor, a semantic characteristic of the search statement on the basis of the target word vector of the word in the first syntax tree and a target model function in a semantic matching model;
    generating, by the processor, for a second syntax tree in the second syntax tree set, a target word vector of a word located at a leaf node of the second syntax tree, and generating a semantic characteristic of the search result corresponding to the second syntax tree on the basis of the target model function and the target word vector of the word in the second syntax tree;
    calculating, by the processor, a similarity between the semantic characteristic of the search statement and the semantic characteristic of the search result in the search result set; and
    sorting, by the processor, the search result in the search result set on the basis of the similarity between the semantic characteristic of the search statement and the semantic characteristic of the search result in the search result set, and pushing the sorted search result set to the user and displaying the sorted search result set on a terminal screen.

2. The method according to claim 1, wherein the generating a semantic characteristic of the search statement on the basis of the target word vector of the word in the first syntax tree and a target model function in the semantic matching model comprises:
    for the leaf node in the first syntax tree, using the target word vector of the word located at the leaf node as a parameter of the target model function in the semantic matching model to generate a node function of a child node corresponding to the leaf node in response to determining that the leaf node is not a root node;

generating a node semantic vector on the basis of the node function of the child node;

determining whether the child node is the root node, and executing the following steps in response to determining that the child node is not the root node: using the node semantic vector of the child node as the parameter of the target model function to generate the node function of a father node corresponding to the child node; generating the node semantic vector of the father node on the basis of the node function of the father node; determining whether the father node is the root node; and generating the semantic characteristic of the search statement on the basis of the node function and the node semantic vector of the father node in response to determining that the father node is the root node; and continuously executing the steps by taking the father node as the child node in response to determining that the father node is not the root node.

3. The method according to claim 2, wherein a node in the first syntax tree comprises a semantic tag, and the semantic tag is used to characterize a semantic relationship between a plurality of the words; and the determining whether the child node is the root node comprises:

determining whether the semantic tag of the child node matches a preset semantic tag; and determining that the child node is the root node in response to the semantic tag of the child node matching the preset semantic tag, or determining that the child node is not the root node in response to the semantic tag of the child node not matching the preset semantic tag.

4. The method according to claim 1, further comprising generating the semantic matching model, the generating the semantic matching model comprising:

establishing a training model on the basis of a recursive neural network;

acquiring a sample search statement and a sample search result set related to the sample search statement, the sample search result set comprising a viewed sample search result and an unviewed sample search result;

parsing the sample search statement and the sample search result set to generate a third syntax tree and a fourth syntax tree set respectively; and training the training model on the basis of the third syntax tree and the fourth syntax tree set to obtain the semantic matching model.

5. The method according to claim 4, wherein the training the training model on the basis of the third syntax tree and the fourth syntax tree set comprises:

generating an initial word vector of the word located at the leaf node of the third syntax tree, and generating the initial word vector of the word located at the leaf node of a fourth syntax tree in the fourth syntax tree set;

executing the following training steps: generating the semantic characteristic of the sample search statement, the viewed sample search result, and the unviewed sample search result on the basis of an initial model function in the training model, the initial word vector of the word in the third syntax tree, and the initial word vector of the word in the fourth syntax tree; calculating the similarity between the semantic characteristic of the sample search statement and the semantic characteristic of the viewed sample search result, and the similarity between the semantic characteristic of the sample search statement and the semantic characteristic of the unviewed sample search result as a first similarity and a second similarity respectively; determining whether a difference value between the first similarity and the second similarity meets a preset condition, and taking the initial model function and the initial word vector as the target model function and the target word vector respectively in response to determining that the difference value meets the preset condition; and updating the initial model function in the training model and the initial word vector of the word in response to determining that the difference value does not meet the preset condition, taking the updated initial model function and the updated initial word vector as the initial model function and the initial word vector of the word respectively, and continuously executing the training steps.

6. The method according to claim 5, wherein the updating the initial model function in the training model and the initial word vector of the word comprises:

updating the initial model function in the training model and the initial word vector of the word using a back propagation through structure (BPTS) algorithm.

7. The method according to claim 1, wherein before the acquiring a search result set related to a search statement inputted by a user, the method further comprises:

receiving a search voice inputted by the user; and recognizing the search voice to generate the search statement.

8. An apparatus for processing information, the apparatus comprising:

at least one processor; and a memory storing instructions, the instructions when executed by the at least one processor, cause the at least one processor to perform operations, the operations comprising:

acquiring a search result set from a database server via a wired or a wireless connection, the acquired search result set being related to a search statement inputted by a user;

parsing the search statement to generate a first syntax tree, and parsing a search result in the search result set to generate a second syntax tree set;

generating a target word vector of a word located at a leaf node of the first syntax tree;

generating a semantic characteristic of the search statement on the basis of the target word vector of the word in the first syntax tree and a target model function in a semantic matching model;

generating, for a second syntax tree in the second syntax tree set, a target word vector of a word located at a leaf node of the second syntax tree, and generating a semantic characteristic of the search result corresponding to the second syntax tree on the basis of the target model function and the target word vector of the word in the second syntax tree;

calculating a similarity between the semantic characteristic of the search statement and the semantic characteristic of the search result in the search result set; and sorting the search result in the search result set on the basis of the similarity between the semantic characteristic of the search statement and the semantic characteristic of the search result in the search result set, and pushing the sorted search result set to the user and displaying the sorted search result set on a terminal screen.

9. The apparatus according to claim 8, wherein the operations comprises generating the semantic matching model, and the generating the semantic matching model comprises:
- establishing a training model on the basis of a recursive neural network;
- acquiring a sample search statement and a sample search result set related to the sample search statement, the sample search result set comprising a viewed sample search result and an unviewed sample search result;
- parsing the sample search statement and the sample search result set to generate a third syntax tree and a fourth syntax tree set respectively; and
- training the training model on the basis of the third syntax tree and the fourth syntax tree set to obtain the semantic matching model.

10. The apparatus according to claim 9, wherein the training the training model on the basis of the third syntax tree and the fourth syntax tree set comprises:
- generating an initial word vector of the word located at the leaf node of the third syntax tree, and generating the initial word vector of the word located at the leaf node of a fourth syntax tree in the fourth syntax tree set;
- executing the following training steps: generating the semantic characteristic of the sample search statement, the viewed sample search result, and the unviewed sample search result on the basis of an initial model function in the training model, the initial word vector of the word in the third syntax tree, and the initial word vector of the word in each fourth syntax tree, calculating the similarity between the semantic characteristic of the sample search statement and the semantic characteristic of the viewed sample search result, and the similarity between the semantic characteristic of the sample search statement and the semantic characteristic of the unviewed sample search result as a first similarity and a second similarity respectively, determining whether a difference value between the first similarity and the second similarity meets a preset condition, and taking the initial model function and the initial word vector as the target model function and the target word vector respectively in response to determining that the difference value meets the preset condition; and
- updating the initial model function in the training model and the initial word vector of the word in response to determining that the difference value does not meet the preset condition, taking the updated initial model function and the updated initial word vector as the initial model function and the initial word vector of the word respectively, and continuously executing the training steps.

11. A non-transitory computer-readable storage medium storing a computer program, the computer program when executed by one or more processors, causes the one or more processors to perform operations, the operations comprising:
- acquiring a search result set from a database server via a wired or a wireless connection, the acquired search result set being related to a search statement inputted by a user;
- parsing the search statement to generate a first syntax tree, and parsing a search result in the search result set to generate a second syntax tree set;
- generating a target word vector of a word located at a leaf node of the first syntax tree;
- generating a semantic characteristic of the search statement on the basis of the target word vector of the word in the first syntax tree and a target model function in a semantic matching model;
- generating, for a second syntax tree in the second syntax tree set, a target word vector of a word located at a leaf node of the second syntax tree, and generating a semantic characteristic of the search result corresponding to the second syntax tree on the basis of the target model function and the target word vector of the word in the second syntax tree;
- calculating a similarity between the semantic characteristic of the search statement and the semantic characteristic of the search result in the search result set; and
- sorting the search result in the search result set on the basis of the similarity between the semantic characteristic of the search statement and the semantic characteristic of the search result in the search result set, and pushing the sorted search result set to the user and displaying the sorted search result on a terminal screen.

* * * * *